United States Patent Office 3,387,757
Patented June 11, 1968

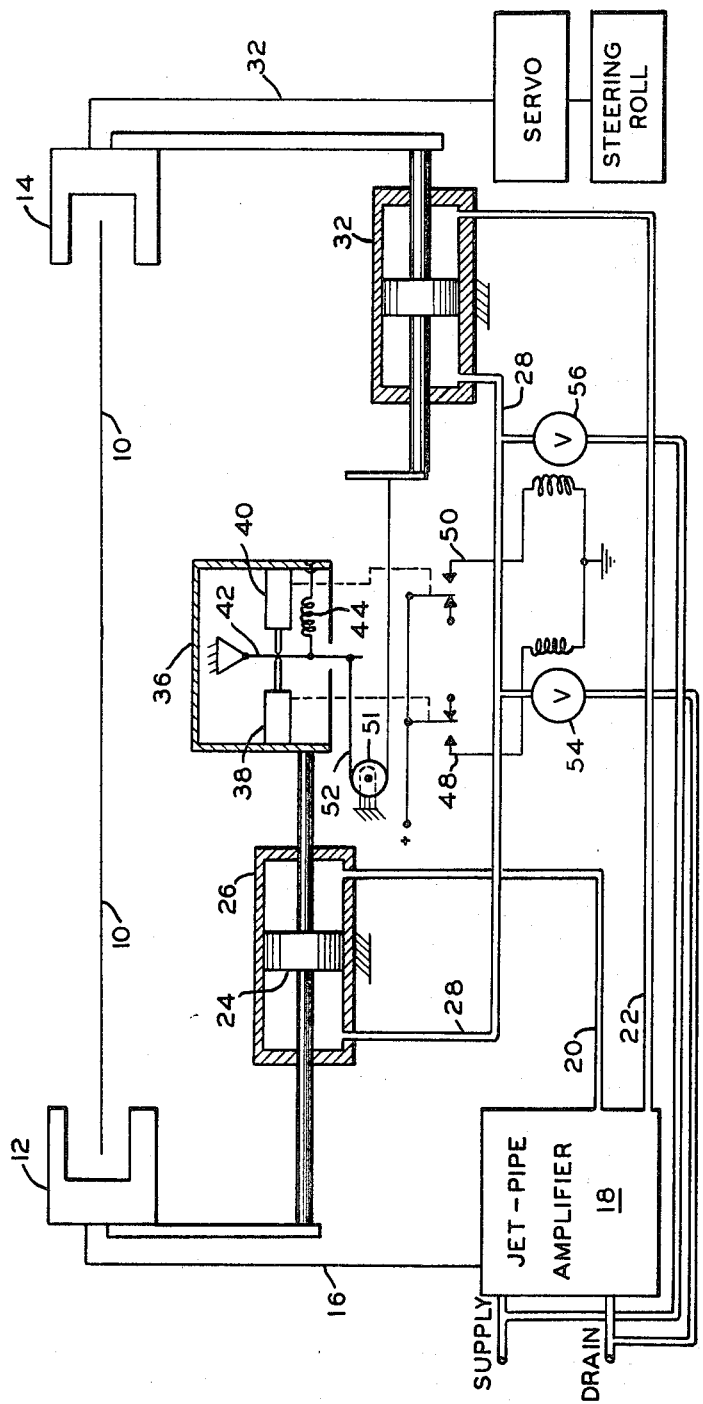

3,387,757
WEB GUIDE APPARATUS
Thomas F. Graffy and Louis Zaka, Chicago, Ill., assignors to GPE Controls, Inc., Morton Grove, Ill., a corporation of Illinois
Filed Feb. 7, 1966, Ser. No. 525,543
6 Claims. (Cl. 226—22)

ABSTRACT OF THE DISCLOSURE

In a hydraulic system, means for insuring synchronous operation of a pair of series connected hydraulic cylinders, despite possible differences in the amount of fluid leakage past the pistons, by comparing the motions of said piston and varying the volume of hydraulic fluid as required whenever the difference between the magnitudes of the motions of the pistons exceeds a predetermined amount.

---

This invention relates to improved apparatus for positioning a moving web, and more particularly, to an arrangement to insure accurate operation of known types of web handling apparatus. A variety of industrial applications require that the centerline of a traveling web be positioned at a predetermined location within a predetermined plane at some station along the path of travel of the web. Variation in web width makes many prior edge-guide systems unsatisfactory in such applications, and requires the use of "centerguiding" (as opposed to "edge-guiding") apparatus. A number of centerguiding systems are known in the prior art. One popular type of center-guide system uses an edge sensor on each side of the web, with the first sensor connected to operate a servo or follow-up apparatus, so that the first sensor tracks a first of the web. The servo also bodily positions the second sensor an equal amount in the opposite direction. The output signal from the second sensor controls a steering roll or a guide roll which positions the web. Such systems are described in Patent 3,024,955, for example. As is well known, the sensors in such systems may be photoelectric, pneumatic, mechanical contact type, or even magnetic, in various applications, and a wide variety of servomechanisms may be used, including hydraulic and electric types, for example. As in very many edge-guide applications, hydraulic servos are frequently preferred.

The overall accurary and freedom from drift in such systems depend upon accurate relationships in the distance between the two sensors and the distance between each sensor and the theoretical centerline, or position to where final delivery of the web centerline is desired. If a given movement of the first sensor provides an opposite bodily movement of the second sensor which is not exactly equal in magnitude, the centerline of the web will depart from the desired line, the original centerline set point. In the prior art a mechanical connection between the two sensors has sometimes been made, using either a cable-pulley system or a rack-pinion arrangement, or a linkage arrangement. These systems have been undesirable in that they limit the allowable amount of sensor travel, thereby limiting permissible web width variation, and the friction, backlash, cable slippage and the like attending such systems also cause problems. A known type of hydraulic link has been used, and is shown in Patent 3,024,955, wherein the inboard and outboard ends of a first hydraulic cylinder positioning the first sensor are hydraulically connected to the outboard and inboard ends, respectively, of a second cylinder positioning the second sensor. Because hydraulic fluid is substantially incompressible, the piston in one cylinder moves substantially the same distance as that in the other cylinder, though in the opposite direction. However, leakage of hydraulic fluid, either across either piston or at the rod packing of either cylinder, allows the two pistons to drift to different distances from the original centerline, resulting in system error. No matter how carefully they are designed or manufactured, dynamic seals of the type required at the two cylinders will eventually leak due to wear and/or ageing. If such systems using hydraulic cylinders drift from a balanced condition due to leakage, large amounts of web material may be spoiled, and in some applications such centerguiding systems have not been feasible to use because of their drift. In many applications it is not possible to have system drift checked repeatedly by an operator. The invention involves a simple and inexpensive means for readily detecting machine error due to such leakage and for automatically correcting the system by compensating for the leakage. Thus it is a primary object of the invention to provide means for automatically detecting and correcting for relative displacement between opposite sensors of a centerguiding web-guide apparatus caused by hydraulic cylinder leakage.

The invention is readily applicable as well to known types of "duplicating" web control systems wherein two hydraulic motors are connected to move simultaneously in the same direction. Systems which superimpose plural webs to form laminates are a typical example. Thus, it is a more basic object of the invention to provide means for automatically detecting and correcting for relative displacement between two hydraulic motor positions in any system where two hydraulic motors are connected in series to be operated by flow of a incompressible fluid.

The invention accordingly comprises the features of construction, combination of elements and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawing, in which:

FIG. 1 is a schematic diagram illustrating a preferred embodiment of the invention.

In FIG. 1 web 10 is shown positioned between first and second edge sensors 12 and 14. In a typical application web 10 may be four or five feet wide. An output signal from the left edge sensor 12 is applied via line 16 to servo-amplifier means 18 indicated as comprising a jet-pipe amplifier which provides an output differential pressure signal on lines 20 and 22. Sensor 12 in various applications may be either photo-electric, pneumatic or may provide a mechanical feeler displacement. In FIG. 1 sensor 12 is assumed to provide a pneumatic signal jet-pipe amplifier assumed to accept pneumatic inputs. Jet-pipe amplifiers responsive to mechanical displacements or forces and to electrical signals are also well known. The output of jet-pipe amplifier 18 is shown connected to two hydraulic rams which are hydraulically connected in series with each other. A signal of one sense from sensor 12 provides an output signal in which the pressure in line 20 exceeds that in line 22, so that piston 24 in cylinder 26 is urged leftwardly, and simultaneously, fluid is expelled from cylinder 26 via line 28 toward the left side of the piston in cylinder 32, and fluid is expelled from cylinder 32 via line 34, so that piston 30 is urged rightwardly. A signal of opposite sense from sensor 12, with line 22 at a higher pressure than line 20, will be seen to move piston 24 rightwardly and piston 30 leftwardly. In any event it is absolutely necessary that the two pistons move exactly equal amounts in opposite directions if the web centerline is to be properly positioned. As shown in the figure, piston 30 is mechanically connected to position sensor 14, and the output signal from sensor 14 is applied via line 32 to operate servomechanism apparatus which positions web positioning mechanism indicated in block form as comprising a conventional web steering roll. The jet-pipe amplifier 18 may be replaced in many applications of the invention by various known control valves as servo-valves which perform substantially the same function of amplifying the sensor signal (and transducing it, if desired). The servomechanism connected to operate the steering roll also may take a variety of forms.

In order that piston 30 always move an equal amount in the opposite direction to the movement of piston 24 and that the two pistons always remain at exactly equal distances from a reference centerline, it is necessary that the total volume of fluid to the left of pistons 24 and 30 in the two cylinders, plus that fluid in line 28 interconnecting the cylinders, which volume may be termed the critical fluid volume, remain constant. Fluid leakage around either piston, or fluid leakage out either cylinder to atmosphere will be seen to allow relative movement of the two sensors 12 and 14 which is not opposite and equal, thereby providing error in the location at which the web centerline is positioned.

In order to detect and correct for system unbalance due to leakage, the invention incorporates means mechanically connected between the two sensors and the two pistons to measure the distance between them, switch means to selectively energize one or the other of two circuits whenever the distance between the two sensors and pistons appears to become unbalanced, and means responsive to the two circuits to maintain the critical fluid volume constant. As shown in FIG. 1, housing 36 is mechanically connected to and bodily positioned by piston 24. Housing 34 contains a pair of oppositely-actuated momentary contact electrical limit switches 38 and 40, a pivotable arm 42, and spring means 44 which act both in tension and compression. During normal operation of the system pivotable arm 42 lies balanced between switches 38 and 40, and both switches remain open. In FIG. 1, the contacts 48 and 50 of the two switches are shown remotely for sake of clarity. Spring 44 is used to maintain tension in cable 52.

Assume that a reduction in web width causes sensor 12 to move one inch to the right. Such movement of sensor 12 and piston 24 will be seen to move housing 36 a corresponding distance. If piston 30 moves in the opposite direction through a corresponding distance of exactly one inch, it will be seen that cable 52 will allow pivotable arm 42 to move to the right exactly the right distance to maintain both switches open. If the two pistons do not move precisely the same amounts in opposite directions, so that they lie unequal distances from the reference centerline, one or the other of switches 38 and 40 will be momentarily closed, momentarily energizing one of two solenoid valves shown at 54 and 56. Thus it may be seen that the connection of pulley 51 and cable 52 to arm 42 algebraically summarizes the displacement of piston 24 and that of piston 30, to provide a displacement of arm 42 (relative to housing 36 and the switch contacts) which is commensurate with the difference in the displacements of the two pistons.

Assume, for example, that fluid leaks out through the seal 58 at the left side of cylinder 30, allowing some leftward travel of piston 30 and sensor 14. The attendant slackening of cable 52 allows arm 42 to pivot counterclockwise as viewed in the figure, thereby closing switch 40 and energizing solenoid valve 56. Energization of valve 56 allows fluid from the system supply conduit to flow into conduit 28 to make up that fluid which leaked through seal 58. The added fluid in line 28 will be seen to displace piston 30 and sensor 14 rightwardly, pulling cable 52 and re-centering arm 42, so that valve 56 will be shut off as soon as the system has been rebalanced.

Assume now instead that fluid leaks right to left around piston 30, allowing some rightward travel of piston 30. Such movement will be seen to slacken cable 52, close switch 38 and energize valve 54, thereby draining fluid from the left side of cylinder 32 until the system has rebalanced. In practice it is easy to arrange switches 38 and 40 so that they close with very small amounts of deviation of arm 42 from a centered condition, so that drifts or unbalances as small as two or three thousandths of an inch may be readily detected and corrected.

As mentioned above, the invention is readily applicable as well to systems, such as various laminating web control systems, wherein two series-connected hydraulic motors are arranged to move simultaneously in the same direction, as well as to the system previously described wherein they move in opposite directions. If pulley 51 and cord 52 are eliminated in FIG. 1, and switch elements 42 and 36 rigidly connected to the piston rods of pistons 24 and 30, respectively, it will be seen that the system will operate in a manner similar to that described to maintain a fixed distance between the two pistons.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

The embodiments of the invention in which an exclusive property or privilege is claimed are defined as follows:

1. Apparatus for centering a moving web, comprising, in combination:
   first and second sensing heads movably mounted at respective first and second edges of said web;
   first servomechanism means responsive to the first only of said sensing heads for moving said first sensing head to track variations in said first edge of said web and for simultaneously moving said second sensing head equal distances in opposite directions, said first servomechanism means including first and second hydraulic rams connected hydraulically in series, the movable portion of each of said rams being mechanically connected to position a respective one of said sensors;
   means for comparing the magnitudes of the motions of said sensors in respective opposite directions;
   means responsive to said comparison for varying the volume of hydraulic fluid in said series hydraulic connection between said hydraulic rams whenever the difference between the magnitudes of the motions of said sensors exceeds a predetermined amount;
   and second servomechanism means responsive to the signal from the second only of said sensing heads for controlling said second edge of said web to track said second sensing head.

2. Apparatus according to claim 1 in which said means for comparing includes electrical switch means responsive to displacements of said sensors and in which said means for varying said fluid volume comprises electrically-controlled valve means connected to be controlled by said electrical switch means.

3. Apparatus according to claim 2 in which said electrically-controlled valve means comprises a first valve connected to a hydraulic pressure supply and a second valve connected to a hydraulic drain.

4. Apparatus for controlling a moving web, comprising, in combination:
   servomechanism means comprising first and second hydraulic rams, each of said hydraulic rams comprising a cylinder and a piston, the two cylinders of said servomechanism means being connected hydraulically in series;
   means mechanically attached to said pistons of said hydraulic rams for comparing the motions of said pistons;
   and means responsive to said comparison for varying the volume of hydraulic fluid in said series hydraulic connection whenever the difference between the magnitudes of the motions of said pistons exceeds a predetermined amount.

5. Apparatus according to claim 4 in which said means for comparing includes electrical switch means responsive to displacements of said pistons and in which said means for varying said fluid volume comprises electrically-controlled valve means connected to be controlled by said electrical switch means.

6. Apparatus according to claim 5 in which said electrically-controlled valve means comprises a first valve connected to a hydraulic pressure supply and a second valve connected to a hydraulic drain.

References Cited

UNITED STATES PATENTS 2,753,689   7/1956   Biggert _____ 60—97

ALLEN N. KNOWLES, *Primary Examiner.*